United States Patent [19]

Murphy et al.

[11] 4,029,271

[45] June 14, 1977

[54] AUTOMATIC APPROACH TO HOVER SYSTEM

[75] Inventors: Richard D. Murphy; Lou S. Cotton, both of Monroe, Conn.

[73] Assignee: United Technologies Corporation, Hartford, Conn.

[22] Filed: Apr. 7, 1976

[21] Appl. No.: 674,705

[52] U.S. Cl. .......................... 244/17.13; 73/178 H; 235/150.22; 244/180; 244/186

[51] Int. Cl.² ........................................ G05D 1/00

[58] Field of Search ............... 244/17.13, 180, 182, 244/183, 186, 188; 235/150.2, 150.22; 73/178 R, 178 H; 340/27 R, 27 SS

[56] References Cited

UNITED STATES PATENTS

| 2,650,046 | 8/1953 | Vanderlip | 244/182 |
|---|---|---|---|
| 3,649,818 | 3/1972 | Sylvander | 235/150.2 |
| 3,711,042 | 1/1973 | Rempfer | 244/17.13 |
| 3,816,716 | 6/1974 | DeGarmo | 235/150.2 |

Primary Examiner—Trygve M. Blix
Assistant Examiner—Reinhard J. Eisenzopf
Attorney, Agent, or Firm—M. P. Williams

[57] ABSTRACT

In a helicopter having an automatic pilot system for controlling the main rotor collective pitch, main rotor longitudinal and lateral cyclic pitch, and tail rotor collective pitch, in response to inputs provided from normal sensors, navigational instruments and controls, (which include among others as is known, doppler radar, a pilot panel, an air speed indicator, a radar altimeter, a barometric altimeter and a longitudinal accelerometer), commands to control automatic approach to a desired hover position are provided to the autopilot system in response to signals normally supplied by a TACNAV unit as well as the sensors, navigational units and controls; controls are provided for altitude and rate of descent, so as to terminate in hover at a desired altitude, as well as for turns, courses, and speed so as to approach the desired point of hover upwind and to decelerate in a controlled fashion to hover.

18 Claims, 11 Drawing Figures

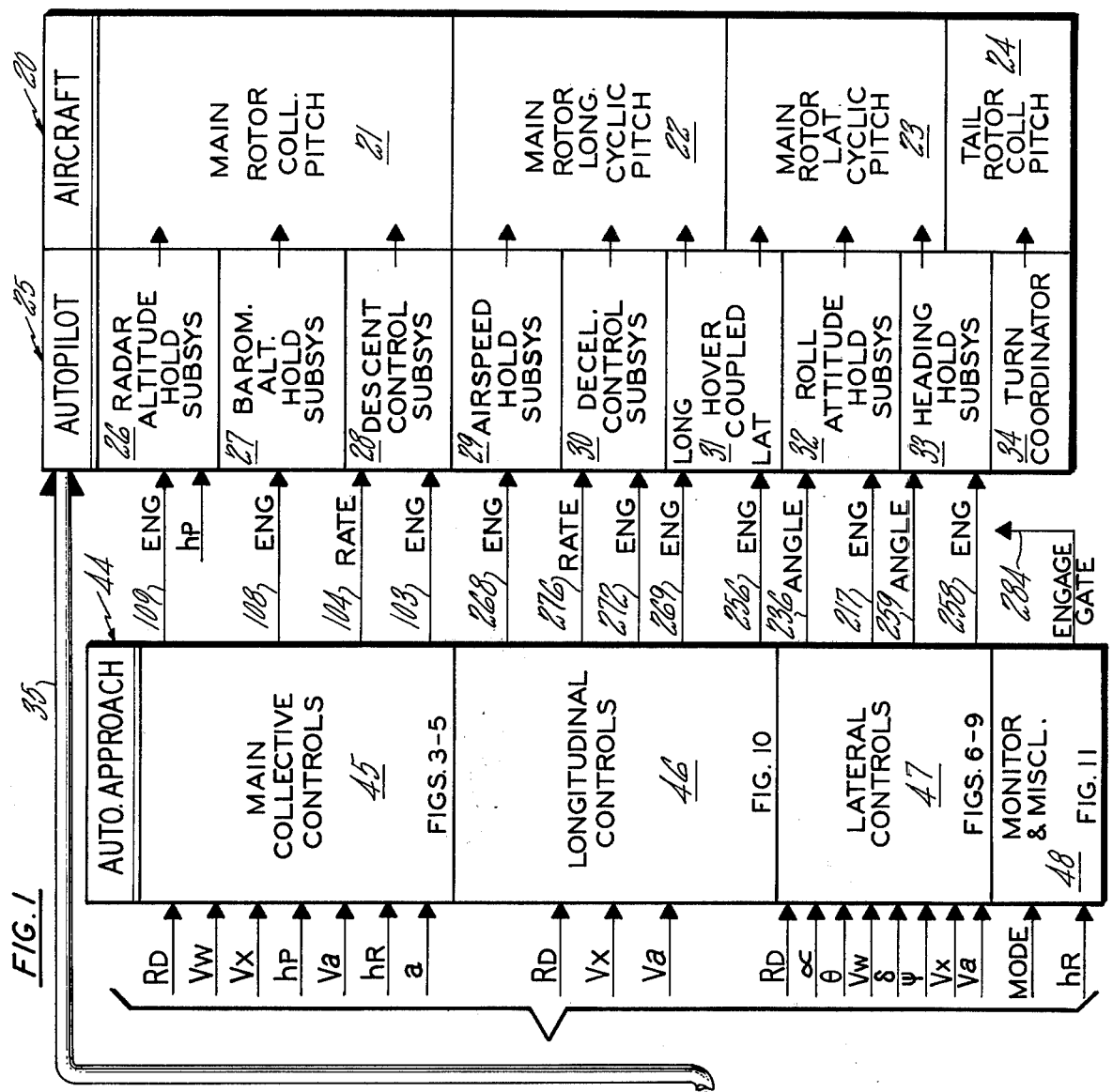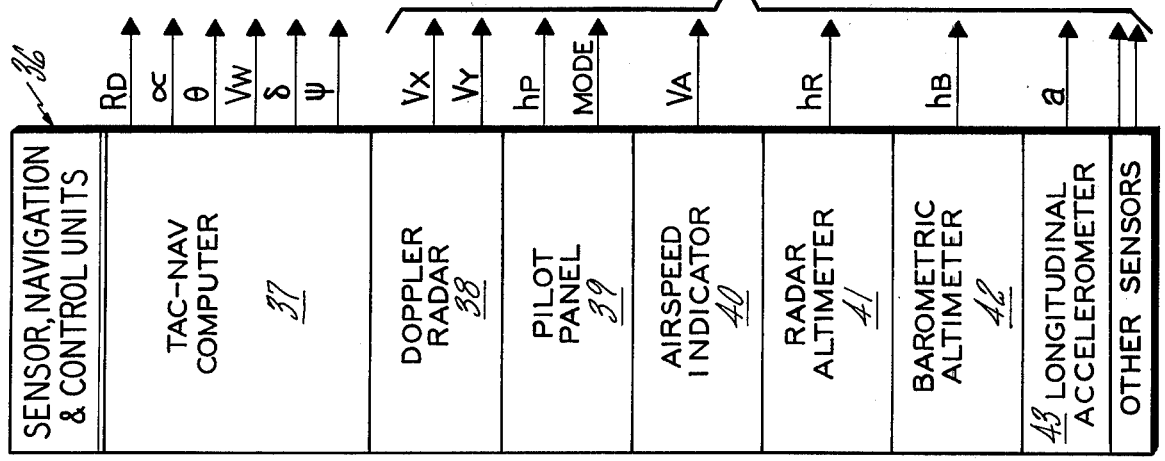

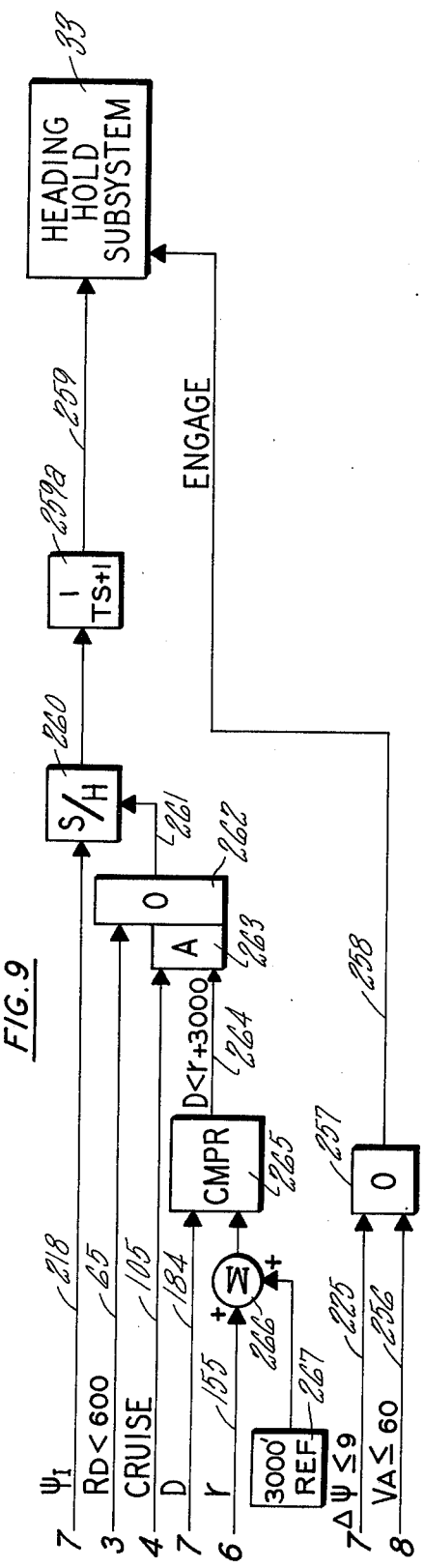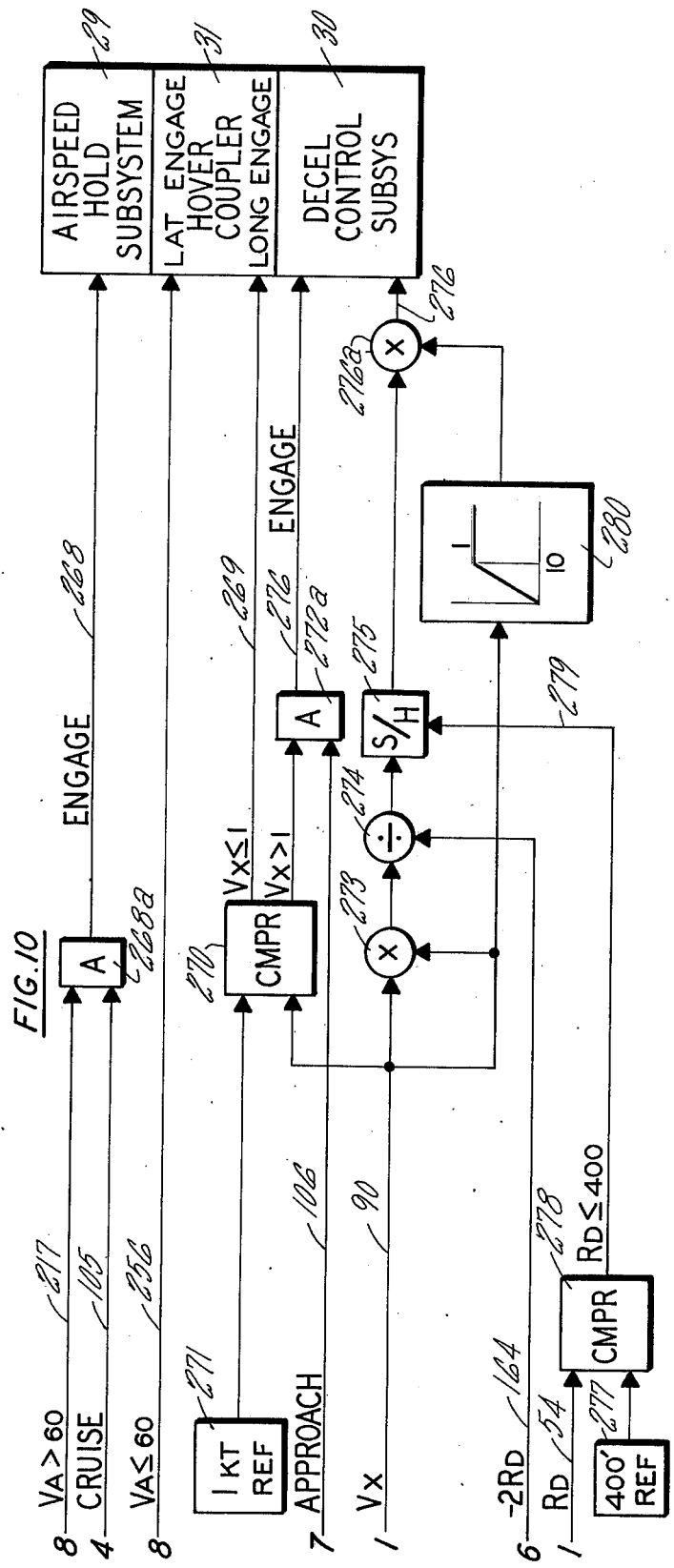

AUTOMATIC APPROACH TO HOVER SYSTEM

This invention was made in the course of or under a contract with the Department of the Navy.

BACKGROUND OF THE INVENTION

1. Field of the Invention

This invention relates to automatic flight control systems, and more particularly to an electronic automatic approach to hover system in which flight parameters are calculated throughout an approach to hover at a desired destination and altitude.

2. Description of the Prior Art

The utilization of a helicopter frequently involves a hover maneuver in which the helicopter is maintained at a fixed point with respect to the earth, and at a low altitude. In some operations, such as rescue operations, servicing sonobuoys, and the like, the maneuver may need to be performed over water, and frequently at night. This renders maneuvering of the helicopter into a desired hover position very difficult without the aid of automatic navigational aids operable in response to inertial and other sensors. In helicopter flight control systems known to the art, only limited assistance is provided to the pilot. Specifically, TACNAV computers provide visual indications to the pilot with respect to courses and distances to desired waypoints or destinations, but these do not automatically control the flight of the aircraft. In addition, the pilot can receive assistance from an autopilot system which can provide controlled rates of deceleration and descent and roll angles in turns, and the like. In order to provide a stable hover, without having the aircraft pitched upwardly, or rolled to one side, it is known to be desirable to establish hover with the aircraft heading against the wind. In the past, to achieve such a hover, the pilot would have to fly the aircraft some distance downwind from the desired destination point, while observing the indications from his TACNAV computer, until he found himself to be at a desired distance downstream from the destination point such that he could decelerate and descend from his present speed and altitude safely to a hover at a desired altitude over the destination point. In prior art systems, the automatic pilot has provisions for an automatic rate of descent and an automatic rate of deceleration which can be engaged; but utilization of these sytems so as to end up at zero speed at a desired altitude over the destination point requires the pilot to estimate the point in time when he will be entering a window which will cause him to reach the desired point of hover at zero speed with the fixed rates of deceleration and descent provided by the automatic pilot system. No computation of the actual distance, or comparison with actual speed, and no corrections for disturbances in the actual flight profile which is achieved, have been available in the art. If the aircraft in fact descends more quickly than the fixed rate of descent established by the automatic pilot system (which could occur due to a down draft, or an increase in wind speed), then the pilot could achieve the desired hover altitude while still traveling at an excessive speed, causing dangerous high speed flight too close to the earth's surface. On the other hand, if descent is too slow with respect to deceleration, the pilot could be flying over the desired destination point at too great an altitude, in which case the aircraft would substantially sink to the desired altitude with high vertical velocity. Since these maneuvers are being performed under extremely dangerous conditions, where the velocity and altitude relationships are adverse with respect to any engine failure recovery procedures which may be necessary, psychologically adverse maneuvers such as rapid rates of descent or low altitude, high speed flying are to be avoided.

SUMMARY OF THE INVENTION

The object of the present invention is to provide completely automatic, closed loop control of an approach to hover at a destination point and desired altitude.

According to the present invention, flight is controlled through an outer turn and an inner turn to the entry of an approach to hover, the approach being upwind and the deceleration and rate of descent being controlled by continuously updated calculations so that the aircraft will reach the desired altitude at a low speed and reach the destination point at zero speed and a desired altitude. According further to the invention, air speed is maintained until the approach is entered, after which a deceleration rate is computed so as to uniformly decelerate to zero speed at the destination point. In further accord with the invention, approach is entered downwind of the desired destination point from an inner turn which is reached by first making an outer turn for intersection with the inner turn, and the altitude desired at the entry of approach is reached at the entrance to the inner turn by uniform descent which is commenced when the aircraft is within a given range of the destination. The course of the aircraft is controlled upon engagement of the automatic system so as to automatically pick either a right hand or a left hand outer turn to place the aircraft most quickly on a direct approach to intersection with an inner turn, which inner turn is based upon a nominal turn rate, and which will cause the aircraft to intersect with an upwind heading to the destination point. In accordance still further with the invention, during the controlled turns, the rate of turn is continuously controlled so as to provide a circular ground track, even though the heading of the aircraft is continuously varying with respect to wind speed.

In accordance with the invention still further, the automatic system is not operated unless there is sufficient air speed, sufficient distance between the aircraft's present position and the intersection with an inner circle so as to be able to make a proper approach, and sufficient time to descent from current altitude to the altitude desired at entry of the approach mode. In accordance still further with the invention, a desired descent profile is continuously calculated, and if the aircraft is at an altitude lower than the desired descent profile, its altitude is maintained until it intersects therewith, after which descent is controlled by the profile.

The foregoing, and other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a simplified block diagram of an aircraft flight control system incorporating the present invention;

FIG. 9 is a schematic block diagram of the heading hold portion of the embodiment of the present invention;

FIG. 10 is a schematic block diagram of portions of the embodiment which control air speed and hold, the hover coupler, and deceleration control of a helicopter.

DESCRIPTION OF THE PREFERRED EMBODIMENT

Figure 2:
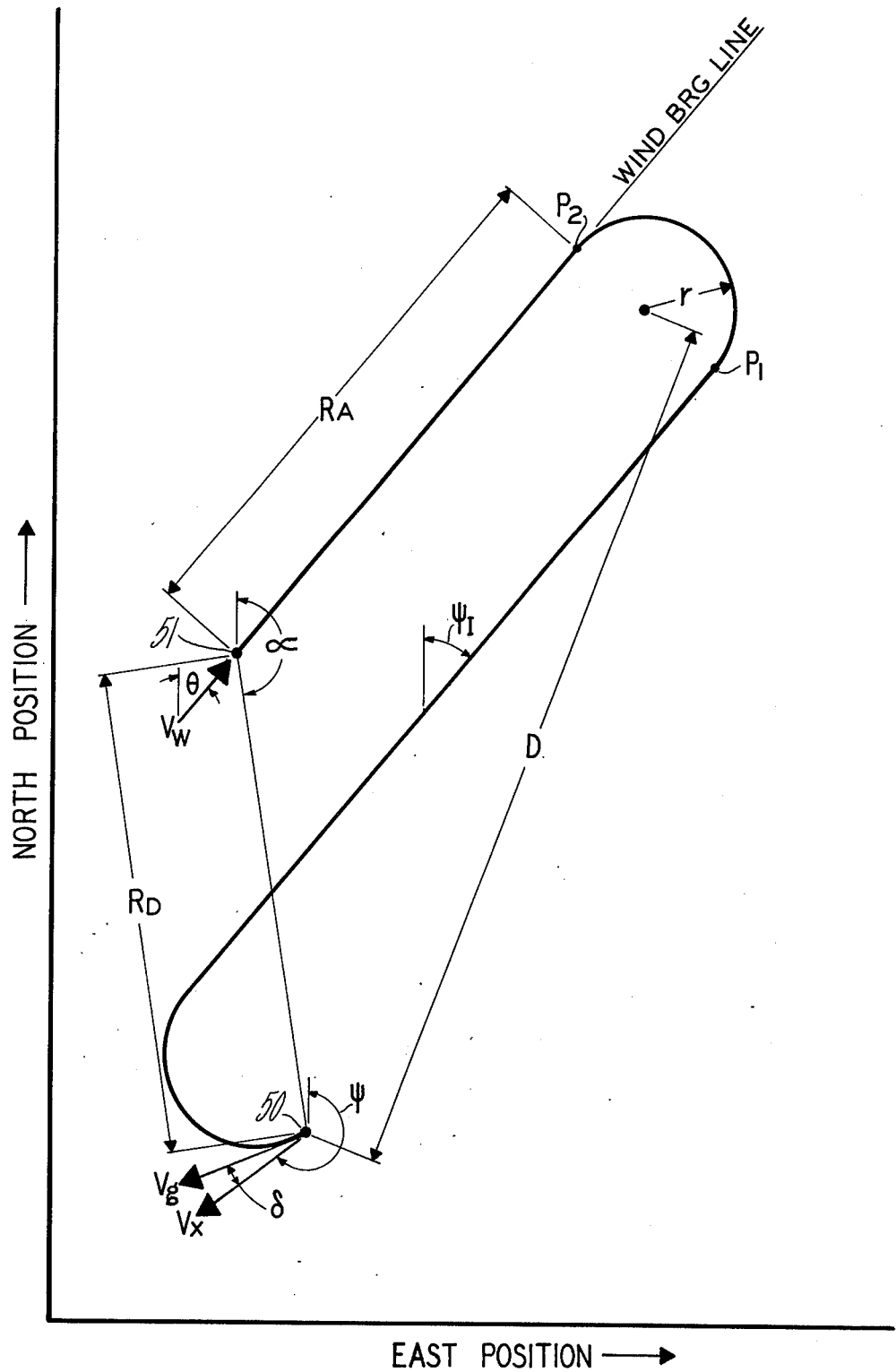
FIG. 2 is a diagramatic illustration of the course of an aircraft in a complete approach to hover utilizing a system according to the present invention.

Referring to FIG. 1 a helicopter having automatic flight controls of the type in which the exemplary embodiment herein is adapted for use is illustrated as including the normal aircraft control functions 20, comprising main rotor collective pitch controls 21, main rotor lingitudinal cyclic pitch controls 22, main rotor lateral cyclic pitch controls 23 and tail rotor collective pitch controls 24. These are the normal controls which may be operated by the pilot in the outer control loop with stability provided by an inner control loop, in the well known fashion. In addition, these aircraft controls 20 are automatically operable in the automatic flight modes by an autopilot system 25 which comprises a radar altitude hold subsystem 26, a barometric altitude hold subsystem 27, a descent control subsystem 28, an air speed hold subsystem 29, a deceleration control subsystem 30, a hover coupler 31, a roll attitude hold subsystem 32, a heading hold subsystem 33, and a turn coordinator 34. The autopilot system 25 generates control signals in response to signals provided over a trunk of lines 35 from sensor, navigation and control units 36, including (other than a normal TACNAV computer 37) a doppler radar 38, a pilot panel 39, an air speed indicator 40, a radar altimeter 41, a barometric altimeter 42 and a longitudinal accelerometer 43, etc.

The automatic approach system 44 of the present invention includes main collective controls 45 described in detail with respect to FIGS. 3–5 hereinafter, longitudinal controls 46 described in detail with respect to FIG. 10 hereinafter, lateral controls 47 described in detail with respect to FIGS. 6–9 hereinafter and a monitor and miscellaneous functions 48 described in detail with respect to FIG. 11 hereinafter. The automatic approach system 44 utilizes some of the same signals provided by the units 36 to the autopilot 25; although not disclosed in detail herein, when the automatic approach system is controlling the autopilot 25, the autopilot 25 will not be normally responsive directly to some of the inputs provided thereto over the lines 35 from the units 36, but will respond in part.

Referring now to FIG. 2, when engaged, the automatic approach system 44 will automatically control the flight from any particular point 50, at any heading, altitude and speed (subject to some conditions described hereinafter), to a selected hover position 51 at a desired altitude, approaching the position upwind. In doing this, the control system will cause the aircraft to fly downwind of the desired point 51 and execute a turn of a determined radius from a point P1 to a point P2 so as to approach upwind; the altitude, speed and heading all being controlled during the approach. This is described in more detail hereinafter.

As described more fully with respect to FIG. 11 hereinafter, the automatic approach system 44 as described herein is assumed to either be operable or inoperable. When operable, the circuits function as in described with respect to the various figures hereinafter; when inoperable, the circuits do not function. When operable, the circuits provide alternative control to the autopilot system until such time as various hold systems are engaged, in which case the hold systems operate in response to the units 36 as they normally do in an aircraft not fitted with an embodiment of the present invention. For instance, when in the automatic hover approach mode, the radar altitude hold subsystem 26 may be engaged by the automatic approach circuitry, and if so, would hold the altitude indicated by the pilot set altitude established at the pilot panel 39, as it would in the normal situation. However engagement of the radar altitude hold subsystem is not as in the normal case, but is in response to the main collective controls 45 of the embodiment herein. As another example, the descent control subsystem 28 can be engaged and provided with a rate by the main collective controls 45, until descent to a proper altitude is completed and then it would not be utilized at all, but rather the radar altitude hold subsystem would be utilized. Similarly, the roll attitude hold subsystem 32 is used during the outer and inner turns in the flight control provided by the automatic approach system 44, but is not used during the straight line flight.

In the description that follows, one simplification has been made so as to not obscure the invention. The simplification is assuming that angle information is given in a normalized fashion and is again renormalized automatically when angles are subtracted from or added to one another. As is known, systems may use a 0° to 360° invention, in which case the addition of two angles larger than 180° must have 360° subtracted from the result therefrom. Also known is a system where all angles are expressed as being between 0° and 180° with an appropriate sine; then the arithmatic combination of one with the other must have its result normalized in a well known fashion according to what the angles really mean. This is not shown herein since it adds undue complexity, and that manner of treating it depends upon the convention used, and is well known in the art.

Figure 3:
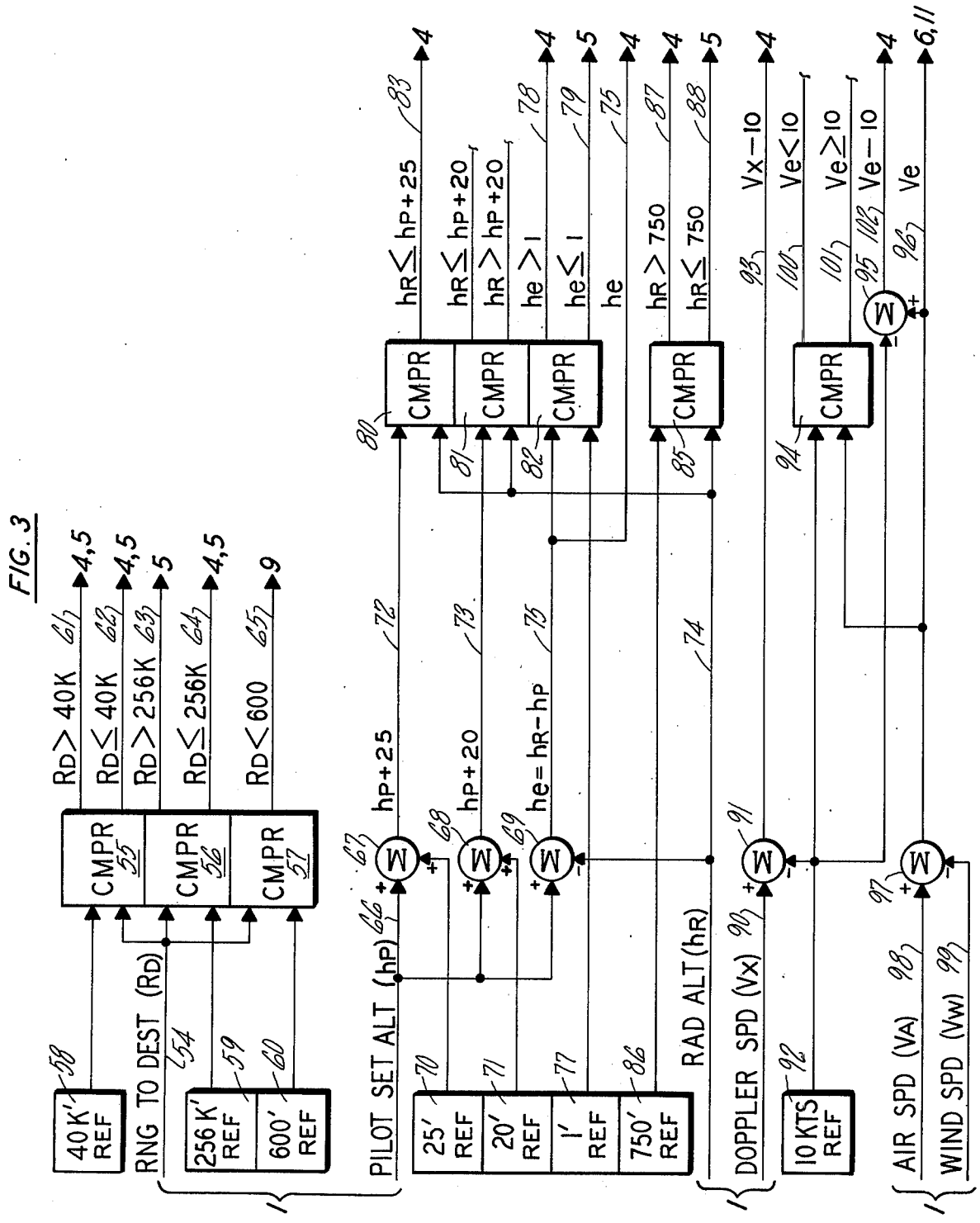
FIG. 3 is a schematic block diagram of circuitry for generating certain parameters used in the embodiment of the invention.
Figure 4:
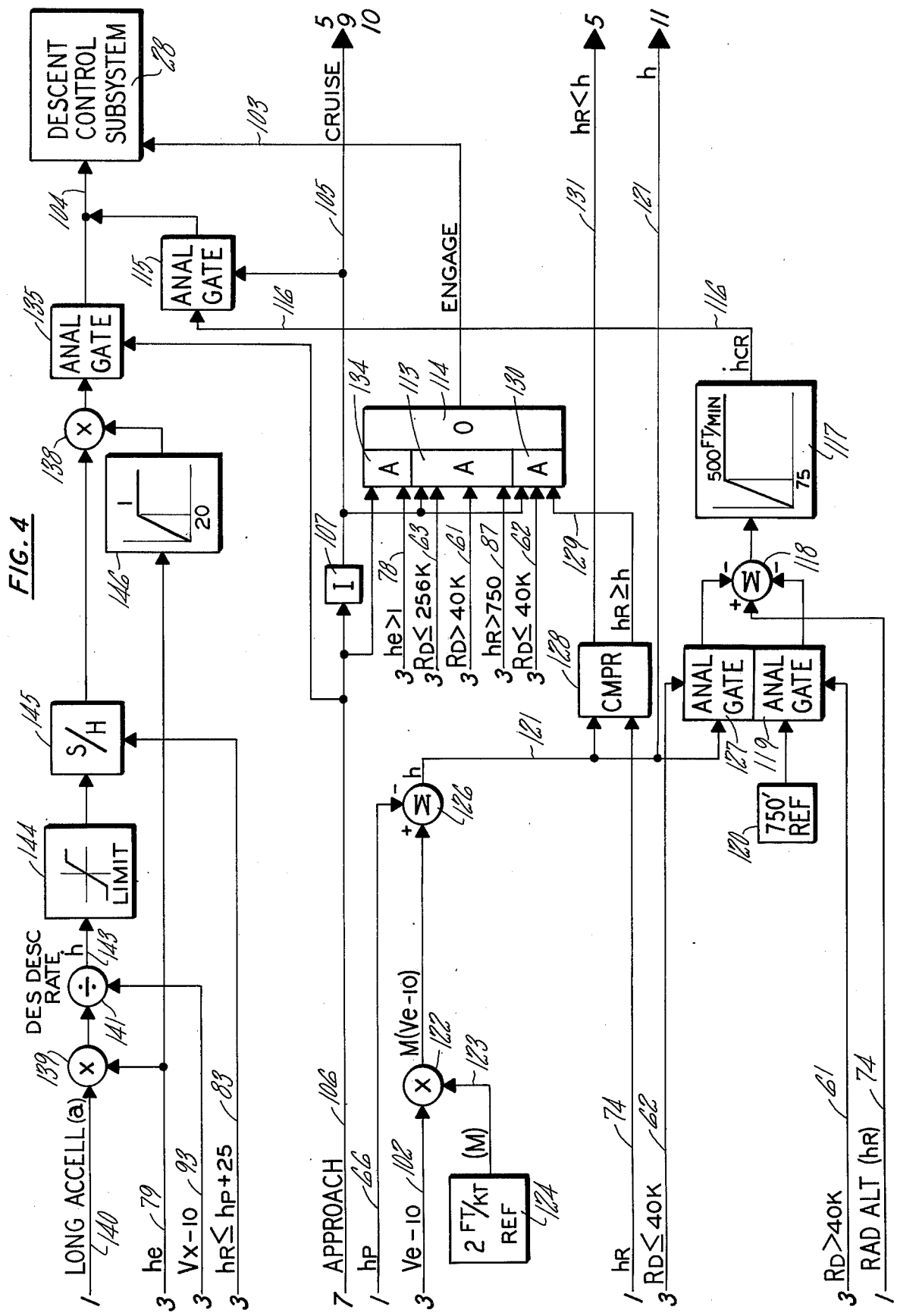
FIG. 4 is a schematic block diagram of the descent control portion of an embodiment of the present invention.
Figure 5:
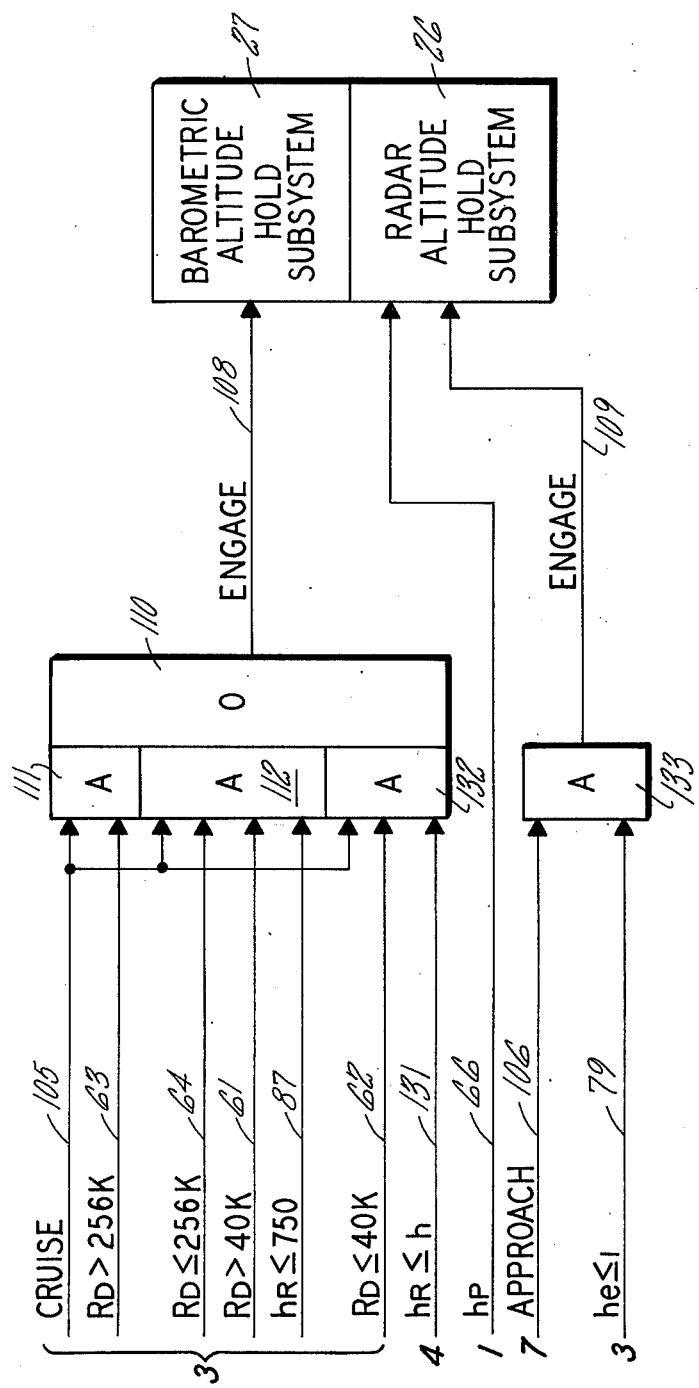
FIG. 5 is a schematic block diagram of altitude hold portions of an embodiment of the present invention.

The main collective controls 45 for the automatic approach system 44 are illustrated in detail in FIGS. 3–5. These controls provide engage signals to the radar altitude hold subsystem 26, the barometric altitude hold subsystem 27, and the descent control subsystem 28; they also provide a desired rate of descent signal to the descent control subsystem 28. Referring to FIG. 3, the generation of a plurality of parameters utilized in FIGS. 4 and 5 is illustrated. Specifically, the range to destination signal ($R_D$) is provided on a line 54 to a plurality of compare circuits 55–57 for comparison with suitable reference voltages provided by sources 58–60 so as to generate signals on a plurality of lines 61–65 indicating whether the range to destination is greater or lesser than 40,000 feet, 256,000 feet, and 600 feet.

The pilot set altitude ($hp$) is presented on a line 66 to a plurality of summing units (which typically comprise resistor junctions or amplifiers having resistors feeding the inverting and not inventing inputs thereto, in a well known fashion). The summing circuits 67, 68 are also fed by voltage reference sources 70–71 which provide voltages representing 25 feet and 20 feet respectively, so as to provide signals on lines 72, 73 representing the pilot set altitude plus 25 feet and the pilot set altitude plus 20 feet, respectively. The summing junction 69 is fed with a radar altitude signal ($H_R$) on a line 74 so as to provide a signal on a line 75 indicative of the error ($h_e$) between the desired or set altitude and the actual altitude as determined by the radar altimeter. This signal is compared in a comparator 76 with a signal from a voltage reference source 82 which provides a voltage representative of one foot of altitude to generate signals on lines 78, 79 indicative of when the error altitude is greater or less than one foot. The radar altitude on line 74 is also applied to a pair of compare circuits 80, 81 for comparison with the signals on the lines 72, 73 so as to generate signals on related lines 82–84 indicative of whether the altitude is within 25 feet or 20 feet of the set altitude, respectively. Alternatively, this is the same as determining whether the altitude error ($he$) is greater or less than 25 or 20 feet, respectively. The radar altitude on the line 74 is also applied to a comparator 85 for comparison with a signal representing 750 feet from a source of reference voltage 86 so as to provide signals on lines 87, 88 indicating whether the altitude is greater or less than 750 ft., respectively.

TABLE ONE

| | AIRCRAFT PARAMETERS | | |
|---|---|---|---|
| SYMBOL | PARAMETER | SOURCE FIG. | REF. NO. |
| $R_D$ | Range to Destination | 1 | 54 |
| $\alpha$ | Bearing to Destination | 1 | 166 |
| $\theta$ | Wind Bearing | 1 | 165 |
| $V_W$ | Wind Speed (Mag.) | 1 | 99 |
| $\delta$ | Drift Angle | 1 | 215 |
| $\Psi$ | Aircraft Heading | 1 | 219 |
| $V_X$ | Velocity Along Heading | 1 | 90 |
| $h_p$ | Pilot-Set Altitude | 1 | 66 |
| $V_A$ | Longitudinal Airspeed (Mag.) | 1 | 98 |
| $h_R$ | Radar Altitude | 1 | 74 |
| $a$ | Longitudinal Acceleration | 1 | 140 |

TABLE TWO

| | GENERATED PARAMETERS | | |
|---|---|---|---|
| SYMBOL | PARAMETER | SOURCE FIG. | REF. NO. |
| $V_g$ | Ground Velocity (explains $\delta$, FIG. 3) | | |
| $h_e$ | Error Altitude ($h_p - h_R$) | 3 | 75 |
| $V_e$ | Desired Speed at Approach Entry | 3 | 96 |
| $h$ | Desired Rate of Descent for Entry | 4 | 121 |
| $H$ | Desired Rate of Descent in approach | 4 | 143 |
| $R_A$ | Approach Range (See FIG. 2) | 6 | 150 |
| $d$ | Desired Approach Deceleration | 6 | 149 |
| $r$ | Desired Inner Turn Radius | 6 | 155 |
| $D$ | Distance to Center | 7 | 184 |
| $\Psi_I$ | Heading to Intercept P1 | 7 | 218 |
| $\Delta\Psi$ | $\Psi_I - \Psi$ | 7 | 221 |

The velocity along heading, or doppler speed signal ($V_X$) on a line 90 is applied to a summing unit 91 along with a signal representing 10 knots of speed from a reference voltage source 92 so as to provide a signal on a line 93 indicative of a speed 10 knots below the doppler-determined velocity along heading. The reference 92 is also applied to a compare circuit 94 and a summing unit 95 which are also responsive to a signal ($V_e$) on a line 96 provided by a summing unit 97 in response to the difference between the magnitude of longitudinal air speed ($V_A$) on a line 98 and wind speed ($V_W$) on a line 99. The compare circuit 94 provides on lines 100, 101 signals indicative of whether the difference between air and wind speeds is less or greater than 10 knots. and the summing unit 95 provides a signal on the line 102 indicative of 10 knots less than the difference between the air and wind speeds.

Referring to FIG. 4, certain of the signals generated as described with respect to FIG. 3 hereinbefore are utilized to engage the descent control subsystem 28 by means of a signal on a line 103, and to provide a rate input to the descent control subsystem 28 by means of a rate signal on a line 104, in both the cruise mode defined by a signal on a line 105 and an approach mode as indicated by a signal on a line 106, which provides the cruise signal on the line 105 by means of an inverter 107. The generation of the approach signal on line 106 is defined with respect to FIG. 7 hereinafter. In addition, the main collective controls 45 provide (as seen in FIG. 5) engage signals on lines 108, 109 to engage the barometric altitude hold subsystem 27 and the radar altitude hold subsystem 26 in such a manner that descent will be caused by the descent control subsystem 28 when required, rough altitudes will be maintained (when permitted) by the barometric altitude subsystem 27, and in the final approach and hover, accurate maintenance of altitude is provided by the radar altitude hold subsystem 26.

In logical order, when in the cruise mode, the barometric altitude retention is caused by the engage signal on the line 108 (FIG. 5) being generated by an OR circuit 110 in response to an AND circuit 111 when the signal on the line 63 indicates that the range is greater than 256,000 ft. Thus any reasonable altitude can be maintained when at the greatest ranges from the destination. However, once the range to destination is less than 256,000 ft., but still more than 40,000 ft. the OR circuit 110 will be operated by an AND circuit 112 only if the radar altitude indication is less than 750 ft., as indicated by the signal on line 87. If, however, the radar altitude is more than 750 ft., then the signal on the line 87 will not be present in FIG. 5 and the AND circuit 112 will not operate. In order to bring the altitude down to 750 ft. (when in the 40,000–256,000 ft. range from the destination), an AND circuit 113 (FIG. 4) will operate an OR circuit 114 so as to generate the engage signal on the line 103 thus engaging the descent control subsystem 28 instead of the barometric altitude hold subsystem 27 of FIG. 5. When in the cruise mode, the rate input signal on the line 104, which commands the descent control subsystem 28 to cause descent at a particular rate, is passed by an analog gate 115 from a signal on a line 116 at the output of a function generator-limiter circuit 117, which may be comprised of a well known break-point diode network. The circuit 117 is established so that it will provide, for large input signals, a fixed maximum rate of descent of 500 ft. per minute; but for input signals representative of 75 ft. or less, the output rate on the line 16 is a linear function of the input, between 0 and 500 ft. per minute. The input to the circuit 117 is from a summing unit 118 which has as its positive input the radar altitude on the line 74, and for ranges to destination in excess of 40,000 ft., as indicated by a signal on the line 61, has a negative input provided from an analog gate 119 which passes a signal representative of 750 ft. from a reference voltage source 120. Thus, for ranges to destination in excess of 40,000 ft., the difference of the present altitude (as determined by the radar altimeter) from 750 ft. is applied to the circuit 117 so as to generate a command rate which is 500 ft. per minute maximum, and below 825 ft. decreases linearly to a zero rate at 750 ft.

A computed, desired rate of descent is calculated, to achieve a desired entry altitude before reaching the inner turn. Specifically, a desired altitude signal ($h$) is generated on a line 121 in FIG. 4 such as will cause a rate in the circuit 117 that will result in a uniform descent from whatever altitude the aircraft has when its range to destination is 40,000 ft. to the set point altitude (desired at the destination point), at a point in time when the aircraft has reached a ground velocity of 10 knots (regardless of the range to target). As an example, for each knot of speed above 10 knots, the desired altitude on this profile (for the purpose of generating a descent rate in the circuit 117) may be on the order of two ft. per knot. In FIG. 4, speeds in excess of 10 knots as indicated by the signal $V_g$-10 on the line 102 are multiplied in a multiplier 122 by a desired slope (M) as represented by a signal on a line 123 from a voltage reference 124 that provides a voltage equivalent to 2 ft. per knot. The multiplier 122 provides a signal indicating a uniform rate of descent to the pilot set altitude, but this rate is used only until approach is reached, as described hereinafter; in approach, other circuits provide the rate, as described hereinafter. For speeds over 10 knots, the output of the multiplier is summed in a summing unit 126 with the desired destination altitude, or pilot set altitude $h_p$ as indicated by a signal on the line 66 so as to provide the desired profile altitude $h$ on the line 121. The profile altitude $h$ remains frozen (as the pilot set altitude $h_p$) for speeds less than 10 knots, due to the multiplier output being zero. This desired profile altitude on the line 121 is passed through an analog gate 127 when the range to destination is less than 40,000 ft. as indicated by the signal on the line 62. The desired profile altitude signal $h$ on the line 121 will cause, through the circuit 117, a descent through the set point altitude.

However, the foregoing utilization of the signal $h$ is only made if the aircraft altitude is higher than the desired profile altitude as indicated by the signal $h$. This is determined by a compare circuit 128 which provides a signal on a line 129 so that an AND circuit 130 will enable the OR circuit 114 to provide the engage signal 103 so that the descent control subsystem 28 will be utilized so long as the radar altitude exceeds the profile altitude. But if the radar altitude is less than the profile altitude, then the compare circuit 128 provides a signal on a line 131 which is utilized in FIG. 5 in combination with the signal on the line 62 to cause an AND circuit 132 to operate the OR circuit 110 to thereby provide the engage signal on the line 108 to engage the barometric altitude hold subsystem 27, instead. In this fashion, should the aircraft be below the desired point on the profile, it will fly at a constant altitude until it intersects the desired profile, and then the roles of the hold subsystem 27 and the descent control subsystem 28 will be reversed so that the desired profile altitude $h$ on line 121 (FIG. 4) will assume control of the desired descent. Since, as is known in the art, no pilot will fly an aircraft at hover altitudes, and thus there will always be a suitable altitude to permit automatic approach to hover in the manner described, it is assured that the profile will be achieved as the aircraft approaches 10 knots near the set point altitude. The desired altitude at the entry of the approach mode is the set point altitude (the altitude indicated by the pilot as the desired hover altitude) as represented by the $hp$ signal on the line 66. As described, because the signal $h$ comprises simply the signal $h_p$ once a speed of 10 knots has been reached, the compare circuit 128 will in fact generate the signal on the line 131 rather than the signal on the line 129 when the aircraft has reached the pilot set altitude $h_p$; this will in turn cause the AND circuit 132 to result in engaging the barometric altitude hold subsystem 27 as described with respect to FIG. 5. Thereafter, once the approach mode has been established, the cruise signal on the line 105 will no longer be present so that the AND circuit 132 can no longer operate. But the approach signal will be present on the line 106; in FIG. 5, if the difference between the radar altitude ($h_R$) and the pilot set altitude ($h_p$) which is defined herein as $h_e$ is equal to or less than 1 foot as determined by the signal on the line 79, then an AND circuit 133 will generate the engage signal on the line 109 to cause the radar altitude hold subsystem 26 to hold the altitude for the remainder of the approach and throughout hover. But if the difference ($h_e$) between the pilot set altitude and the current altitude (as indicated by the radar altimeter) is more than 1 foot, then an AND circuit 134 (top of FIG. 4) is operated by the signal on the line 78 and the approach signal on the line 106, to engage the descent control subsystem 28 and to provide a rate signal on the line 104 from an analog gate 135.

Naturally, if the rate of descent provided during the cruise mode as described immediately hereinbefore has brought the aircraft to the desired altitude (which generally will not be the case), the circuitry at the top of FIG. 4 will not be utilized. But for the general case, the main collective controls 45 will continuously compute a desired descent rate which will bring the aircraft from its present altitude to the pilot set, desired hover altitude $h_p$ in the same length of time that it will take the aircraft to linearly decelerate from its existing ground speed to 10 knots. Since the cruise descent controls described hereinbefore have commanded the aircraft to an altitude point on the desired approach profile (by the signal $h$ on the line 121 as described hereinbefore) and since the longitudinal controls 46 (as described with respect to FIG. 10 hereinafter) will have at this point commenced commanding a descent rate on the order of 1 knot per second, this desired calculated descent rate during approach will be 2 feet per second or 120 feet per minute. Continuous computation ensures that errors arising from wind and deceleration changes, control system inaccuracies, external disturbances, as well as initial system engagements at altitude below the desired approach profile, will be compensated for, thereby providing more sophisticated control than would an assumed fixed rate of descent. Specifically, the desired descent rate h is found by dividing the error between current altitude as indicated by the radar altimeter ($h_R$) and the pilot set altitude ($h_p$) by the remaining time; in turn, the remaining time is determined by dividing the required remaining decrease in velocity by the current longitudinal acceleration. These functions are provided at the top of FIG. 4 by a multiplier 139 which multiplies the longitudinal acceleration (a) on the line 140 by the altitude error $h_e$ on the line 79 and dividing the result, in a divider 141 by the remaining desired reduction in velocity to the 10 knot rate, as indicated by the $V_x$-10 signal on the line 93. This provides the desired descent rate signal (h) on a line 143 which is passed through a limiter 144 (to ensure that the commanded rate will not be excessive). The limited, desired descent rate is passed through a sample and hold circuit 145 to a multiplier 138 for application on the line 104 as the rate input to the descent control subsystem 28. However, when the altitude is within 25 feet of the pilot set or desired hover altitude, as indicated by a signal on the line 82, the computed signal is frozen in the sample and hold circuit 145 and remains at its last computed value as applied to the multiplier 138. This rate will continue to cause descent; and when the error altitude is within 20 feet of the desired or pilot set altitude, the error altitude applied through a limiting function generator 146 to the multiplier 138 linearly reduces the multiplier output, so that the rate of descent command is linearly decreased below 20 feet as a function of the remaining altitude error.

When the altitude error is less than one foot, indicating that the aircraft is within one foot of the pilot set altitude $h_p$, then the signal on the line 78 (center of FIG. 4) will disappear, so the AND circuit 134 will become blocked and the OR circuit 114 will no longer supply an engage signal on the line 103 to the descent control subsystem 28; and, the signal on the line 79 (FIG. 5) will cause the AND circuit 133 to provide the engage signal on the line 109 to cause the radar altitude hold subsystem 26 to hold the pilot set altitude of the aircraft throughout the remainder of the approach, and throughout hover.

The lateral controls 47 are described in detail with respect to FIGS. 6-9. These controls provide angle and engage inputs to the roll attitude hold subsystem 32 and the heading hold subsystem 33 of the autopilot 25. The heading hold subsystem, in turn, controls main rotor lateral cyclic pitch and tail rotor collective pitch in the known fashion.

Referring again to FIG. 2, the course to be followed in the automatic approach to hover point 51 from any point of beginning 50 is established in a compound fashion, in accordance with certain defined desired flight parameters. To begin with, as stated hereinbefore, the approach is to be made into the wind. It is also defined herein, for exemplary purposes, that the approach be made at a constant deceleration, such as 1 knot per second. Then the range from the final point 51 to the point P2 where the approach is entered ($R_A$) can be determined from the velocity at the point of entry and the desired constant deceleration rate. Since the approach is into the wind, the ground speed at the commencement of the approach will be the difference between the air speed and the wind speed so that the approach range then becomes the negative of the square of the velocity at the point of entry ($V_e$) divided by twice the deceleration rate d, as set out in equation (1) of the Table of Equations. This is achieved at the top of FIG. 6 by a multiplier 147 which squares the $V_e$ signal on the line 96, the output of which is provided to a divider 148 which divides the square by twice the desired deceleration rate as determined by a voltage reference 149, which has a voltage equivalent to two knots per second. The result is the approach range signal ($R_A$) on a line 150, which is squared in a multiplier 151 to provide the square of the approach range ($R_A^2$) on a line 152.

TABLE OF EQUATIONS $$R_A = -\frac{V_e^2}{2a} \qquad (1)$$

$$D = [R_A^2 + R_D^2 + r^2 - 2R_D (R_A \cos |\alpha - \theta| + r \sin |\alpha - \theta|)]^{1/2} \qquad (2)$$

$$\Psi_I = \alpha + 180 + \delta \pm \left( \sin^{-1} \frac{R_A \sin |\alpha - \theta| - r \cos |\alpha - \theta|}{D} + \sin^{-1} \frac{r}{D} \right) \qquad (3)$$

$$\phi \simeq \tan^{-1} \frac{V_x [V_x - V_W \cos (\theta - \Psi)]}{gr} \qquad (4)$$

Next to be considered is that there will be a turn of uniform ground radius r fron a point P1 (which is on the turn circle at a point of tangency to the approach to the turn) to the point P2 ( which is directly downwind of the end point at the approach range). The radius r is determined by a defined, nominal turn rate, which in the example herein is taken to be 3° per second, as provided by a voltage reference source 153 (at the bottom of FIG. 6) to a divider 154, which divides the longitudinal air speed signal magnitude on the line 98 to provide the radius r on a line 155. In order to intercept the point P1, the aircraft must navigate in the cruise mode through an outer turn that begins at the initial point 50, and along a course to a point P1. To generate the heading to intercept ($\Psi_I$) it is first necessary to generate the distance from the aircraft to the center of the inner turn (D), from purely geometrical relationships according to equation (2) of the Table of Equations. This is started in FIG. 6 (generating the parameters of equation 2)), by feeding the signal on line 155 representing $r$ to both inputs of a multiplier 156 so as to generate a factor $r^2$ on a line 157, and by providing a reference voltage 158 representative of gravity for multiplication with $r$ in a multiplier 159, so as to produce a signal $gr$ on a line 160. In addition, the range to destination signal ($R_D$) on the line 54 is squared in the multiplier 161 so as to produce $R_D^2$ on the line 162, and is passed through an amplifier 163 having a gain of 2 so as to produce a signal equal to 2 $R_D$ on a line 64. The wind bearing signal ($\theta$), provided by the TACNAV computer 37 on the line 165, is subtracted from the bearing to destination signal ($\alpha$) on the line 166 in a summing unit 167 so as to provide a signal on a line 168 equal to the angle included between the current bearing from the final point 51 and the reciprocal bearing to the point 51 on the line 168. This signal is compared in comparator 169 with a zero reference voltage from a source 170 so as to determine by signals on lines 171, 172 whether it is positive or negative. If positive, the signal on the line 168 is passed through an analog gate 173 to an amplifier 174, but if negative, a signal is selected from an inverting amplifier 175 for passage through an analog gate 176 to the amplifier 174, thereby to provide at the input to a resolver 177 the absolute value of the difference in the two angles. The resolver 175 provides a sine signal on a line 178 and a cosine signal on a line 179, in a well known fashion.

Figure 6:
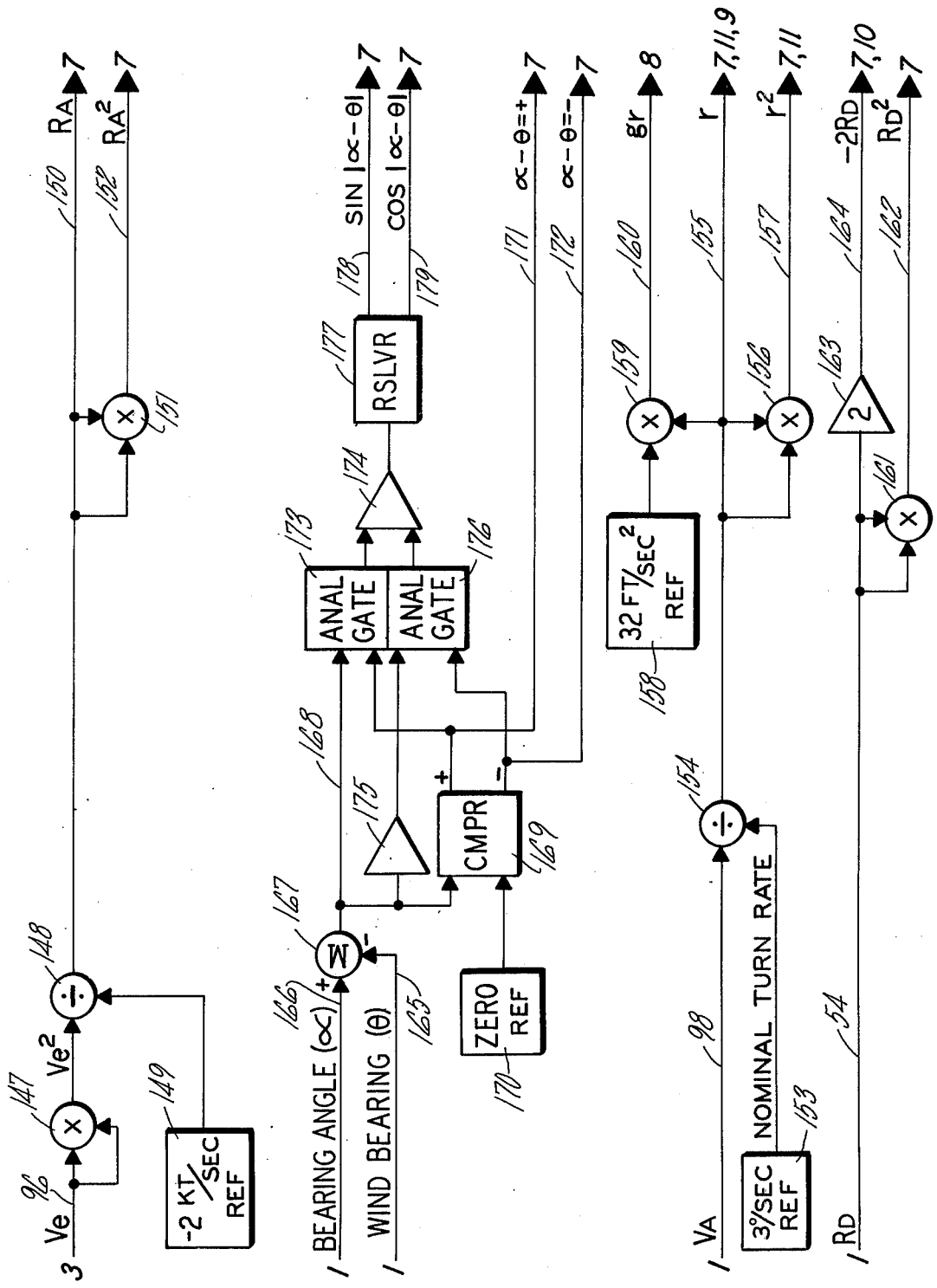
FIGS. 6 and 7 are schematic block diagrams of circuits for generating parameters used in an embodiment of the present invention.
Figure 7:
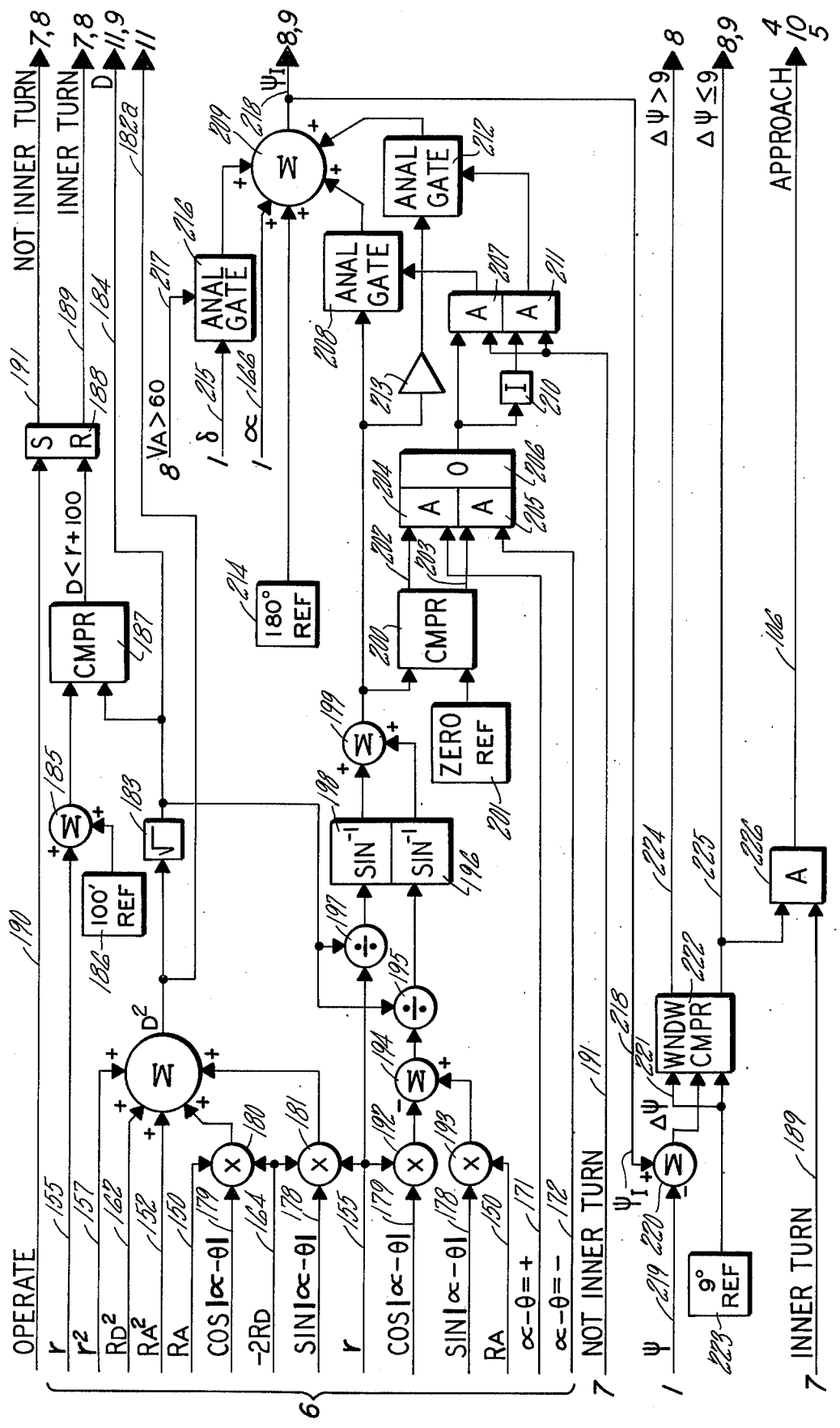

The parameters generated in FIG. 6 are utilized in FIG. 7 to generate the distance (D) to the center of the inner circle. Specifically, a pair of multipliers 180, 181 generate the cosine and sine terms of equation (2), and a summing unit 182 combines all of the terms, the output of which is equal to $D^2$; the square root of this is taken in a square root circuit 183 (which may comprise a high gain amplifier having feedback to input through a multiplier in which the output is squared, so as to provide the square root in the well known fashion). This provides the signal D on a line 184, which is used, among other things, to determine when the inner turn has been reached, which is defined herein to be when the distance D is within 100 ft. of the radius $r$ of the inner circle. Specifically, the radius $r$ on the line 155 is summed in a summing unit 185 with the voltage from a 100 ft. reference source 186 for comparison in a comparator 187 with D; when the comparator indicates D to be within 100 ft. of $r$, a bistable latch 188 is reset so as to generate an inner turn signal on a line 189; the bistable latch 188 is set upon initiation of the unit (as described hereinafter), by an operate signal on a line 190 to cause generation of a not inner turn signal on a line 191. Thus, the not inner turn signal is present from the start-up of operation until the intercept with the inner turn is nearly reached, and for the remainder of the approach, all of the way to hover, the inner turn signal is thereafter present.

The heading required of the aircraft to reach the point P1, the approach entry P2 and destination 51, is referred to herein as $\Psi_I$. It is generated in FIG. 7 according to equation (3) of the Table of Equations. As described more fully hereinafter, wind drift is not compensated by heading whenever the aircraft air speed drops below 60 knots, so the $\delta$ term is removed at that point. The sign of the arc sine terms is determined by the sign of $\alpha - \theta$. A pair of multipliers 192, 193 and a summing unit 194 generate the sine and cosine terms of equation (3), which are provided to a divide circuit 195, the arc sine of which is taken in an arc sine circuit 196 (which may comprise a high gain amplifier having a resolver in its feedback path with the sine output of the resolver being fed back to the input of the amplifier so as to drive the amplifier to provide the arc sine, in a well known fashion). Similarly, a divider 197 provides the $r$ term of equation (3) and the arc sine thereof is taken by an arc sine circuit 198. The arc sine's are summed in a summing unit 199 to provide the bracketed portion of equation (3). The sine of this portion is determined in a comparator 200 by comparison with a voltage from a zero reference source 201 so as to develop signals on lines 202, 203 respectively indicating whether the bracketed portion is positive or negative. If positive, an AND circuit 204 will operate if $\alpha - \theta$ is also positive as indicated by the signal on the line 171; if negative, an AND circuit 205 will operate if $\alpha - \theta$ is also negative as indicated by the line 172. In other words, whenever the sine of the bracketed portion is the same as the sine of $\alpha - \theta$, an OR circuit 206 will be operated by one or the other of the AND circuits 204, 205. This in turn can cause an AND circuit 207 to gate an analog gate 208 to pass the bracketed term to a summing unit 209 without inversion; otherwise, an inverter 210 can cause an AND circuit 211 to operate an analog gate 212 so as to pass a signal from an inverter 213 to the summing unit 209. Thus when the bracketed portion agrees with the sin of $\alpha - \theta$, it is passed without inversion, and when it disagrees, it is inverted before being passed to the summing unit 209. Either of the AND circuits 207, 211 can operate only prior to entry of the inner turn as indicated by the not inner turn signal on the line 191. The remaining terms of equation (3) are added into the summing unit 209; specifically, a voltage representing 180° is provided by a 180° reference source 214; the bearing from destination is provided on the line 166; the drift angle is provided on a line 215 from the TACNAV computer 37, but it is passed through an analog gate 216 only when the air speed is greater than 60 knots as indicated by a signal developed as described hereinafter on a line 217. Thus when the air speed is less than 60 knots, the analog gate 216 is blocked so that the term $\Psi_I$ no longer includes a drift input, and drift is not corrected by heading below 60 knots. The output of the summing unit 209 comprises the $\Psi_I$ signal on line 218.

At the bottom of FIG. 7, the aircraft heading ($\Psi$) provided on the line 219 by the TACNAV computer 37 is subtracted from the desired heading to intercept ($\Psi_I$) on the line 218 in a summing unit 220 so as to provide a $\Delta\Psi$ signal on a line 221, applied to a window comparator 222 with a signal representing 9° from a reference source 223 so as to generate a $\Delta\Psi$ greater than 9 signal on the line 224, or a $\Delta\Psi$ equal to or less than 9 signal on a line 225. Once the inner turn has been reached, and $\Delta\Psi$ falls below 9°, an AND circuit 226 generates the approach signal on the line 106.

In addition to determining when the aircraft heading is within 9° of the heading required for intercept of the next point on course, the intercept heading ($\Psi_I$) is also used to determine whether a right turn or a left turn is needed for the outer circle for the most direct approach to P1, as is described with respect to the center of FIG. 8 hereinafter. Both the inner and outer turns are made at constant air speed and since the wind angle varies with heading in turns, this results in a varying ground speed. To maintain a constant radius turn in ground coordinates, it is necessary that the turn rate be continuously varied during the turn, so the required roll angle for the outer and inner turns must be continuously computed. For a coordinated turn (where the acceleration forces and gravity combine in a vector through the floor of the aircraft), with a non-changing wind magnitude, the roll angle $\phi$ is developed as shown in equation (4) of the Table of Equations. This is accomplished at the top of FIG. 8 by a resolver 227 which provides a signal on a line 228 equal to the cosine of the difference between the wind bearing and the aircraft heading, the resolver responding to a summing unit 229 which subtracts the heading signal on the line 219 from the wind bearing signal on the line 165. The cosine function on the line 228 is multiplied by the wind speed signal on the line 99 by a multiplier 230, and the product is subtracted in a summing unit 231 from the velocity along heading signal on the line 90. The difference signal output is multiplied by velocity along heading in a multiplier 232 and the product is divided by the gravity factor ($gr$), in a divide circuit 233. Then the arc tangent is taken by an arc tangent circuit 234 to provide the angle $\phi$ on a line 235. This angle is applied in a faded fashion to a line 236 by a lag circuit 236a without inversion by an analog gate 237, or after inversion in an inverter 238 by means of an analog gate 239, in dependence upon whether a right turn or a left turn is desired. A right turn is indicated by the operation of an OR circuit 240, and in the absence of that operation, a left turn is indicated by operation of an inverter 241.

The determination of a right inner turn being desired to operate the OR circuit 240 is made by comparing the bearing to destination with the wind bearing in a window comparator 242 to see if this angle is between 0° and 180°, in response to a source 243 which provides a voltage indicative of 0°, and a source 244 which provides a voltage indicative of 180°, against the output of a summing unit 245 which subtracts the bearing to destination on a line 166 from the wind bearing on the line 165. If this angle is between 0° and 180° and the inner turn has been reached as indicated by the signal on the line 189, then a right turn will be indicated. But if this angle is between 180° and 360° during an inner turn, then the absence of operation of the AND circuit 245 will indicate a left turn is required. Prior to the reaching the inner turn, the not inner turn signal on the line 191 can control the outer turn through and AND circuit 246. If the aircraft heading is within +180° of the heading to the inner circle, as indicated by a signal on a line 247 from a window comparator 248, prior to reaching the inner turn, the AND circuit 246 will indicate that a right hand turn is desired. But if the aircraft heading is not within +180° of the heading to the inner circle, then a left hand turn will be indicated by the failure of the AND circuit 246 to operate. The failure of either AND circuit 245, 246 to indicate a right hand turn will cause the OR circuit 240 to not operate so that the inverter 241 will instead indicate a left hand turn. The window comparator compares the desired heading signal on the line 219 with the aircraft heading signal on the line 219 and with the output of a summing unit 249 which provides a signal 180° higher than the aircraft heading. Neither the OR circuit 240 nor the inverter 241 will operate either of the analog gates 237, 239 except when the difference in the aircraft heading and the intercept heading is greater than 9° due to the operation of either one of two AND circuits 250, 251 by the signal on the line 224. Instead, when the error is less than 9°, the signal on the line 225 will operate an analog gate 252 which will pass a voltage from a zero angle reference source 253 to the lag circuit 236. The lag 236 is there so that stepping from one analog gate to another will not cause step function changes at the input to the roll attitude hold subsystem 32, but rather will achieve these changes in a smooth fashion, as is known in the art. The arc tangent circuit 234 may comprise a high gain amplifier having a resolver in its feedback path, the sine output of the resolver being divided by the cosine output of the resolver and the result fed back to the input of the high gain amplifier, such that the input will be attempting to reach the tangent of the input signal thus causing the output to achieve the arc tangent, as is known in the art. The roll altitude hold subsystem 32 is engaged by the signal on the line 217 indicating that the air speed is greater than 60 knots. This signal is generated in a comparator 254 in response to the air speed signal on the line 98 and a voltage indicative of 60 knots from a reference source 255.

Figure 8:
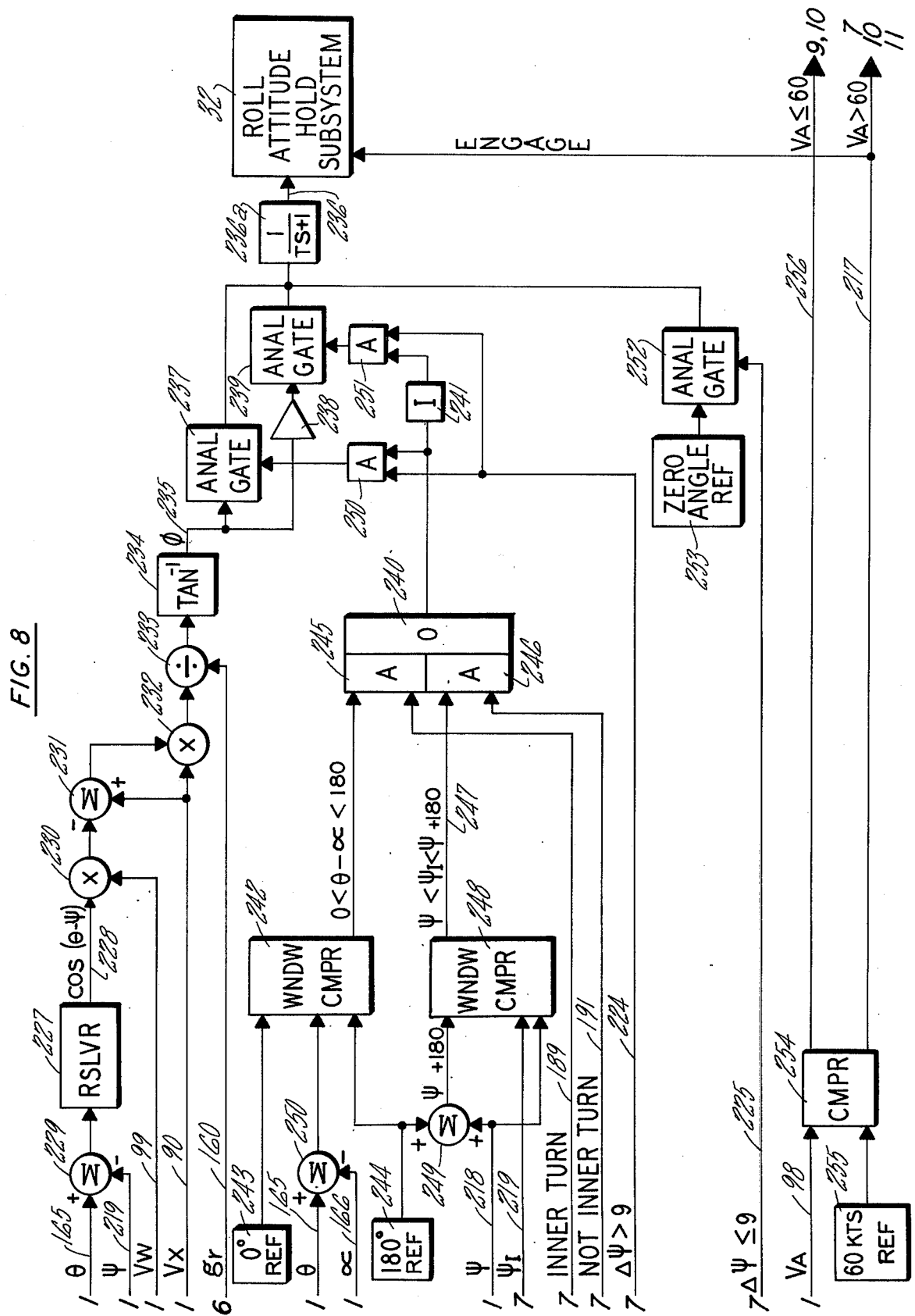
FIG. 8 is a schematic block diagram of roll attitude control portion of the embodiment of the present invention.

In FIG. 9, whenever the air speed is less than 60 knots as indicated by a signal on a line 256, or when the difference in aircraft heading from heading to point P1 is less than 90° as indicated by the signal on the line 255, or OR circuit 257 will generate an engage signal on the line 258 to engage the heading hold subsystem 33 rather than engaging the roll attitude hold subsystem 32 as described in FIG. 8. The heading hold subsystem 33 is provided a heading angle on line 259 by a lag circuit 259 in response to a sample and hold circuit 260, which passes the heading to point P1 signal on the line 218 thereto until it is held by a signal on the line 261. This signal is generated by an OR circuit 262 whenever the range to destination is less than 600 ft., as indicated by a signal on the line 65, or when an AND circuit 263 is operated in the cruise mode by the signal on the line 105 contemporaneously with a signal on the line 264 indicating that the distance to point P1 is within 300 ft. of the radius. This is determined by a compare circuit 265 which compares the distance to the center of the inner turn circle (D) on line 184 with the output of a summing unit 266 which provides a signal equal to the sum of the inner turn circle radius on the line 155 and the output of a voltage reference source 267 equal to 3,000 ft. Thus the heading is maintained in the sample and hold circuit 260 whenever the range to destination is less than 600 ft. or whenever the distance to the center of the inner circle is within 3,000 ft. of the radius of the inner circle.

Referring now to FIG. 10, when the system is initially operated during cruise, one of the conditions is that the air speed be greater than 60 knots. This being the case, the signal on the line 217 is passed by an AND circuit 269 in the presence of the cruise signal on the line 105, to engage the air speed hold subsystem 29 so as to maintain the initial speed. But when the air speed drops below 60 knots (in approach), the signal on the line 256 will engage the lateral channel of the hover coupler 31, and when the doppler speed drops below 1 knot, a signal on a line 269 will engae the longitudinal channel of the hover coupler 31. This signal is generated by a compare circuit 270 in response to a 1 knot reference voltage source 271 and to the doppler speed signal on the line 90. When entering the approach mode as indicated by a signal on the line 106, an AND circuit 27 will engage the deceleration control subsystem.

The circuitry at the bottom of FIG. 10 continuously computes a linear deceleration rate from the known remaining distance to the destination ($R_D$) and ground speed ($V_X$). This is done by the known relationship of acceleration and time, which is equivalent to the acceleration being equal to one half the square of the speed over the remaining distance. In FIG. 10, the ground speed on line 90 is squared in the multiplier 273 and the product is divided by negative twice the remaining distance on the line 164 by a divide circuit 274. This is continuously passed through a sample and hold circuit 275 and through a multiplier 276a to provide the deceleration rate on a line 276 through the deceleration control subsystem 30 of the automatic pilot 25. This computation is continuously done, but is of no effect until the AND circuit 272 engages the deceleration control system in the approach mode. A 400 ft. reference voltage is provided from a source 277 to one input of a comparator 278 for comparison with the range to destination signal on the line 54 to provide a signal, indicating that less than 400 ft. remain to the destination, on a line 279. This forces the sample and hold circuit 275 into the hold mode so that the acceleration rate is no longer computed, but is maintained at its last computed rate at 400 ft. The reason for this is that extremely small variations in the ground speed result in very great variations in computed deceleration rate when the range to destination becomes very small. In order to fade the deceleration rate to zero, the ground speed signal on the line 90 is applied to a limiting function generator 280 which provides the other input to the multiplier 276a, and causes the multiplier to simply multiply by one or pass the signal from the sample and hold circuit unattenuated until such time as the ground speed reaches ten knots or less; then the input to the multiplier 276 from the limiting function generator 280 is linearly faded to zero as $V_X$ approaches zero, so as to cause a smooth reduction in the deceleration rate until such time as the ground speed reaches 1 knot, at which time the AND circuit 272 will become blocked thereby no longer engaging the deceleration control subsystem. Then the hover coupler takes over to place the aircraft permanently into hover in a known fashion.

Figure 11:
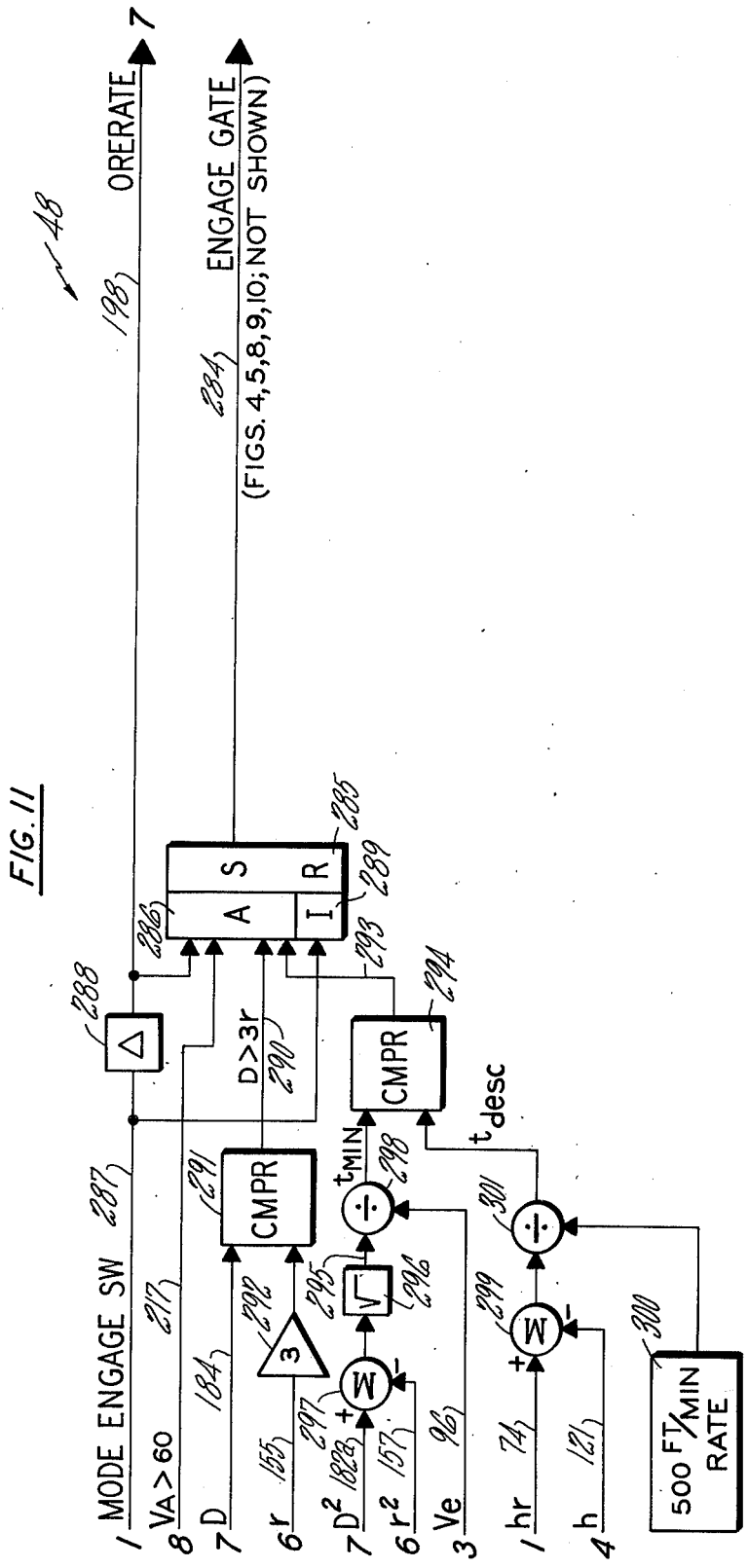
FIG. 11 is a schematic block diagram of a monitor and miscellaneous controls for controlling the engagement of the system set forth in the embodiment herein.

Referring now to FIG. 11, the monitor 48 generates an engage gate signal on a line 284 whenever a bistable latch 285 is set by an AND circuit 286 that monitors initial conditions when the automatic approach system of the present embodiment is sought to be engaged by the pilot, as indicated by a signal on a line 287 from a mode engage switch on the pilot panel 39 (FIG. 1). This signal is passed through a delay circuit 288, the delay time of which is just sufficient to allow the system to become settled after being turned on and then it generates the operate signal on the line 198, which incidentally sets the not inner turn latch on FIG. 7 as described hereinbefore, and more importantly tests the conditions at the AND circuit 286. Whenever use of the automatic approach system is not desired, the absence of the signal on the line 287 is fed through an inverter 289 to cause the latch 285 to be reset. The engage gate signal on the line 284, although not so shown in detail in the other FIGS., is used to gate each of the engage signals to the autopilot subsystems as referred to hereinbefore; this can be achieved by placing an AND circuit in each of the engage lines such that the subsystems cannot be engaged without the presence of the engage gate signal on the line 284. In order to operate, the AND circuit 286 must sense that the air speed is greater than 60 miles per hour as indicated by the signal on the line 217. It must also sense that the distance to the center of the inner turn is greater than 3 times the radius of the inner turn since, in the worst case, the aircraft could be flying upwind at a distance from the point P1 which is separated from P1 by the nominal desired turn diameter for the inner and outer turns. This condition is indicated by a signal on a line 290 from a compare circuit 291 which compares the distance to the center of the inner turn (D) on a line 84 with the radius signal on the line 155 multiplied 3 times in an amplifier 292. The AND circuit 286 is also responsive to a signal on a line 293 from a compare circuit 294 which determines whether the time required to descend from the present radar altitude to the desired entry altitude ($h$) at a 500 ft. per minute descent rate is less than the minimum time remaining to travel the distance to P1 at the present ground speed. The distance to P1 is provided on a line 295 as the square root, taken in a square root circuit 296, of the difference between the square of the distance to the center of the inner turn circle and the square of the radius of the inner circle, taken in a summing circuit 297. This then is divided by the ground speed on the line 96 which is found in FIG. 3 as the difference in the air speed, by a divider 298. The time to descent to the entry altitude is found by subtracting the present altitude on the line 74 from the computed entry altitude on the line 121 in a summing unit 299, the output of which is multiplied by a 500 ft. per minute from a reference source 300 in a divider 301. Thus the engage gate signal on the line 284 would be provided when operation of the automatic approach system is desired only if the air speed is greater than 60 knots, the aircraft is far enough away to be able to turn into the point P1, and there is enough time remaining to reach the desired approach entry altitude.

Although not shown, sensing of a very low windspeed (i.e., less than 5 knots) could be used to force $\Psi_I$ to $\Psi$, thereby flying directly to hover, the approach mode being instituted when the range to destination equals the approach range ($R_A$), simply to save flying time when the turn into the wind is not needed.

In the embodiment described hereinbefore, no particular convention has been adopted for angles, and no particular method has been shown for normalizing angles (such that additions and subtractions come out between 0° and 360° with the appropriate sign), as described hereinbefore. In addition, certain of the signals have been shown as being provided by the TACNAV, whereas some of the signals may in fact be provided directly by the navigational sensors of the aircraft; an example is aircraft heading which may typically be provided directly from navigational sensors of the aircraft, rather than from the TACNAV computer. In addition, other terminology and signal combinatorial relationships have been shown in a general, or simplified fashion; thus, depending upon conventions used in careful definition of aircraft flight control parameters, certain signals which are added herein may be subtracted as implemented, and certain signals taken as being positive may in fact show up as negative in certain instances. For instance, longitudinal acceleration is referred to herein, but in fact the signal has meaning only when the aircraft is decelerating, since descent occurs only during deceleration of the aircraft from initial air speed. Additionally, although no provisions have been shown to insure that the automatic hover approach system of the present invention will not be initiated unless a sufficient altitude is established, it is felt to be assured that no aircraft will be operated at an insufficient altitude without a significantly sufficient reason; and such altitude can therefore be assumed to be higher than the pilot set point altitude. Of course, a minimum altitude such as 50 ft. could be prescribed in a fashion similar to minimum air speed, as described with respect to FIG. 11 hereinbefore.

The present embodiment does not show the details of utilizing the engage gate signal generated in FIG. 11 to block the use of the system in engaging the various subsystems of the autopilot system because the nature of the systems in any given implementation of the present invention will define the manner in which these signals should be employed. For instance, the automatic hover approach may be operated as one mode of a multimode flight control system, the engagement or disengagement of the automatic pilot subsystems being integrated in such system. Therefore, the details have not been shown herein since the manner of employment of a signal such as the engagement gate signal is well within the skill of the art.

As described herein for simplicity, the rate limiting function generators such as the generators 146 and 117 in FIG. 4 and the generator 280 in FIG. 10 have been shown with rates which decrease linearly to zero. Naturally, it would be within the invention to have these rates decreased other than linear; it is also apparent that the rates should not decrease completely to zero in the case where this would cause asymptotic approach to the takeover by some other subsystem of final control or the achievement of an ultimate desired rate or destination of altitude, speed or position. Thus these rates may decrease in a desired fashion to a desired small amount, to suit any implementation of the present invention.

There has been described an automatic approach to hover system which can be analyzed in various ways. First, the system will operate only if it has a cruising speed, is a sufficient distance with respect to that cruising speed from entry to a final, inner turn so as to be able to make the turn and is at a sufficient distance from the destination so as to be able to descend to the pilot set desired hover altitude at a given descent rate in the same time it will take to decelerate from the initial air speed to zero as it traverses from the exit of the final, inner turn to the final destination. The system has a cruise mode and changes to an approach mode as the aircraft leaves the final, inner turn and makes the upwind approach to the final destination. So long as the system operates in the cruise mode, the air speed is maintained at the initial air speed; thereafter, the air speed is uniformly reduced as a function of current air speed and range to destination, until it is a short distance from the destination, after which it is reduced substantially linearly to nearly zero.

The altitude of the aircraft is controlled as a function of cruise or approach mode as well as range to destination. When in the cruise mode, for very high ranges, the altitude is maintained as the current barometric altitude; for intermediate ranges, descent is controlled at a fixed rate unless the altitude falls below a desired profile, which profile is related to the current speed of the aircraft; for speeds falling below the desired profile, the altitude is held by the radar altimeter until the desired profile is again intercepted. When in the approach mode, aircraft descent is controlled by a descent rate which relates to the longitudinal deceleration by the ratio of remaining altitude to descent to the remaining velocity deceleration to be achieved.

The only absolutes in the related deceleration and descent controls are the current and desired altitudes, the current and desired velocity, the current range to destination, and the current rate of deceleration. Thus the system very accurately controls the relationship between deceleration and descent in terms of the actual achieved rates, speeds, distances and altitudes, continuously, as the aircraft traverses the approach from exiting the final turn to reaching the final destination.

Control of the aircraft course is in accordance with roll angles defined for an outer turn and an inner turn, which are continuously computed in a varying fashion during the turns so as to achieve an arcuate ground track having a constant radius that is defined by the initial air speed and a nominal turn rate. In addition to roll angles provided to ensure coordinated turns, the system provides course to intercept of the entry to the inner turn at a point tangential to the exiting of a first, outer turn, the exiting of the inner turn on the upwind course to the destination, and the intercept with the destination itself. Aside from picking the direction of the outer turn in order to reach a point tangential to the inner turn with a minimum course, and aside from computing roll angle for the defined outer and inner turns, the course computations are substantially conventional.

A primary feature of the invention is providing new functions not heretofore provided in any hover approach control system. The most important of these is calculation of deceleration and descent rates actually required from an actual point of entry of an approach to reach the desired destination, speed and altitude; the next most important is the continuous computation of the deceleration and descent rates throughout the approach in order to reach the desired destination and altitude with concurrent desired speed. Additional functions include the provision of entry into an upwind approach at an initial air speed with a proper altitude to permit descent to desired altitude at nominally a desired descent rate in the same time required to decelerate from initial air speed to standstill at nominally a desired deceleration rate. The reaching of this point of approach with two turns of a radius constant with respect to the ground and determined by an initial turn rate as a function of the initial air speed is yet an additional function not provided heretofore; this permits achieving entry into a desired upwind approach with a known altitude related to initial speed, while traversing a minimum course.

In the present embodiment, the nominal descent rate from current altitude to pilot set desired hover altitude is continuously computed in one fashion or another to permit entry of the final, inner turn at substantially the correct altitude for entry into the final approach as described hereinbefore, so that altitude can be maintained substantially constant during the turn, thereby to minimize adverse psychological human factor effects; on the other hand, the air speed is in contrast maintained until completion of the final inner turn, and the initial air speed is utilized to define, from a desired deceleration rate, the range of the approach required to decelerate nominally at a desired uniform rate to standstill at the destination, from which all other calculations are computed.

The embodiment herein has been described in a fashion which is simplified in some respects as described hereinbefore, basically in terms of analog electrical circuitry; however, it should be appreciated that a wide variety of modes and methods which are fully equivalent to those utilized herein may be incorporated in the assemblage of hardware to perform the functions which are clearly set forth and identified herein; in fact, in dependence upon the particular aircraft and related apparatus to be found on said aircraft in which the present invention is to be employed, the best mode of practicing the invention may be utilization of a digital computer which provides sampling of parameters and calculation of control parameters at rates which are in excess of the normal response speeds of the aircraft, so as to provide the aircraft with commands which result in uniform, smooth maneuvering of the aircraft. However, it should be understood by those skilled in the art that the exemplary embodiment herein is calculated to disclose the significant relationships of the present invention, whereas a fully digital, programmable computer embodiment hereof would mask these relationships with complexity.

Thus although the invention has been shown and described with respect to an exemplary embodiment thereof, it should be understood by those skilled in the art that the foregoing and various other changes, omissions and additions may be made therein and thereto without departing from the spirit and the scope of the invention.

Having thus described a typical embodiment of our invention, that which we claim as new and desire to secure by Letters Patent is:

1. In an aircraft including an autopilot system and having navigation means providing signals indicative of aircraft flight parameters and the course and distance to a destination and a pilot set means for providing a desired hover altitude at said destination, a hover approach control system responsive to signals from said navigation means and said pilot set means to control aircraft flight through said autopilot system, comprising:
course means providing course control signals to control the heading of the aircraft to place said aircraft on a course toward said destination at a point downwind therefrom;
speed means for providing speed control signals to control the speed of said aircraft to decelerate from its speed at said point to standstill at said destination; and
altitude means responsive to said speed means for providing altitude signals to control the altitude of said aircraft for descent from its altitude at said point to said desired altitude, said altitude means generating said altitude control signals as a function of said speed control signals and range to destination throughout traverse of said aircraft from said point to said destination.

2. The invention according to claim 1 wherein said altitude means generates said altitude control signals to command aircraft descent to provide descent to said desired altitude from current altitude in the time required to decelerate from current speed to a low, fixed speed while traveling from its current position to a low, fixed speed while traveling from its current position to said destination.

3. The invention according to claim 2 wherein said altitude means computes a descent rate signal as the product of: (1) the ratio of current altitude above desired altitude to current velocity above desired velocity at desired altitude, times (2) current longitudinal acceleration.

4. The invention according to claim 1 wherein said speed means provides said speed control signals as a function of current ground speed and current range to destination.

5. The invention according to claim 4 wherein said speed means provides a deceleration rate signal in proportion to the ratio of the square of the current ground speed to the current range to destination.

6. The invention according to claim 4 further comprising:
mode means alternatively providing a cruise signal defining operation of said hover approach system in a cruise mode until the aircraft is substantially at said point or an approach signal defining operation of said hover approach system in an approach mode when said course means indicates said aircraft is on said course from said point to said destination; and wherein
said speed means responds to said mode means to provide said speed control signals to cause said aircraft to maintain current airspeed in response to said cruise signal and to cause said aircraft to decelerate from current airspeed to standstill at said destination in response to said approach signal.

7. The invention according to claim 1 wherein said course means provides said course control signals to cause said aircraft to approach said point along an arcuate ground track of constant radius.

8. The invention according to claim 7 wherein said course means provides said course control signals to cause said aircraft to approach said arcuate ground track tangentially.

9. The invention according to claim 7 additionally comprising:
means for rendering said hover approach system operable following the attainment by said aircraft of a current airspeed in excess of a given minimum airspeed, and otherwise rendering said hover approach system inoperable; and wherein
said speed means provides said speed control signals to cause said aircraft to maintain said current airspeed prior to reaching said point; and wherein
said course means provides said course control signals to cause said aircraft to approach said point along an arcuate ground track of a radius defined by the ratio of said current airspeed to a fixed desired nominal rate of turn at the entrance of said aircraft along said ground track.

10. The invention according to claim 7 wherein said course means provides course control signals to control the roll angle of said aircraft in a continuously varying manner along said arcuate ground track to compensate for changes in relative wind direction to said aircraft as it traverses said arcuate ground track.

11. In an aircraft having navigational means including sensors and a tactical navigation computer providing signals indicative of ground speed along heading, altitude, and range to destination; having a selectively operable pilot control for providing a signal indicative of a pilot set altitude; and having an automatic pilot system including subsystems operable in response to respective engage input signals thereto for holding barometric altitude and for controlling rate of descent according to a desired input rate of descent; an automatic hover approach altitude control subsystem, comprising:

first means responsive to said range to destination signal to provide signals indicative of a span of intermediate ranges, ranges greater than said span, and ranges less than said span;

second means responsive to said altitude signal to provide a signal indicative of the aircraft altitude being greater or less than a nominal, fixed altitude;

third means responsive to said pilot set altitude signal and to a signal indicative of groundspeed of the aircraft to provide a signal indicative of a profile of desired altitude as a function of groundspeed and pilot set altitude;

and fourth means, responsive to said first, second and third means, connected to said barometric hold subsystem and operable to provide an engage input signal thereto in alternative response to said range signals indicating a range greater than said span, or to concurrence of said range signals indicating a range in said span and to said aircraft altitude being less than the nominal fixed altitude, or to concurrence of said range signals indicating a range less than said span and said aircraft altitude being less than the desired altitude indicated by the profile signal output of said third means.

12. The invention according to claim 11 further comprising:

fifth means operable in response to said first, second and third means connected to said rate of descent controlling subsystem and operable to provide an engage signal thereto in alternative response to concurrence of said range signals indicating a range in said span and said aircraft altitude being greater than the nominal fixed altitude, or to concurrence of said rage signals indicating a range less than said span and said aircraft altitude being greater than the desired altitude indicated by the profile signal output of said third means; and sixth means providing a descent rate to said descent rate control subsystem.

13. Apparatus according to claim 12 wherein said sixth means is connected for response to said first means and said third means and provides said descent rate signal as a function of said profile signal in response to said range signals indicating a range less than said span and as a function of a fixed altitude in response to said range signals indicating a range within or greater than said span.

14. In an aircraft having navigational means including sensors and a tactical navigation computer providing signals indicative of ground speed along heading, altitude, and longitudinal acceleration; having a selectively operable pilot control for providing a signal indicative of a pilot set altitude; and having an automatic pilot system including a subsystem operable in response to an engage input signal thereto for controlling rate of descent according to a desired input rate of descent; an automatic hover approach altitude control subsystem, comprising:

first means responsive to signals indicative of aircraft altitude and pilot set altitude to provide an error signal indicative of the difference therebetween;

second means for providing an engage signal to said descent control subsystem in response to said error signal indicating a very small difference between aircraft and pilot set altitudes; and third means responsive to said longitudinal acceleration signal, said error signal and said groundspeed signal to provide a desired rate of descent input signal to said descent control subsystem to cause descent to the pilot set altitude in the same time that the speed of the aircraft will decrease to a fixed nominal amount at the current rate of deceleration.

15. The invention according to claim 14 wherein said third means includes means to sample and hold said desired descent rate signal when said error signal reaches a nominal fixed amount and to reduce said desired rate of descent signal as a function of said error signal for error signals less than substantially said nominal amount.

16. The invention according to claim 14 wherein said navigational means further provides signals indicative of bearing to destination and aircraft heading, and further comprising:

fourth means responsive to said bearing to destination signal and to said aircraft heading signal to generate an approach mode signal indicative of the aircraft heading upwind toward said destination and otherwise providing a signal indicative of a cruise mode; and fifth means responsive to said mode signals to gate said desired rate of descent signal to said descent control subsystem in response to said approach mode signal and to provide an alternative rate signal to said descent control subsystem in response to said cruise mode signal.

17. The invention according to claim 16 wherein said fifth means includes:

means to provide said alternative rate signal as a function of an altitude/speed profile determined as the difference between pilot set altitude and the product of the groundspeed of the aircraft times a fixed ratio of desired altitude per unit of groundspeed.

18. In an aircraft having navigational means including sensors and a tactical navigation computer providing signals indicative of ground speed along heading, airspeed, radar altitude, longitudinal acceleration, range to destination, aircraft heading, wind direction, wind speed, aircraft drift angle and bearing to destination; having a selectively operable pilot control for providing a signal indicative of a pilot set altitude; and having an automatic pilot system including subsystems operable in response to respective engage input signals thereto for holding radar altitude according to a desired input altitude, for holding barometric altitude, for controlling rate of descent according to a desired input rate of descent, for holding airspeed, for decelerating according to a desired input rate of deceleration, for holding lateral position and for holding longitudinal position, for maintaining a roll attitude according to a desired input roll angle, and for holding heading according to a desired input heading; an automatic approach to hover system comprising:

means responsive to airspeed and wind speed for defining a desired approach range; means responsive to a desired approach range and pilot set altitude for defining a desired entry to approach altitude; means for engaging said airspeed holding subsystem until reaching approach entry;

means responsive to range to destination for engaging said barometric altitude hold subsystem in response to very large ranges to destination;

means responsive to wind speed, airspeed and pilot set altitude for defining a desired altitude profile;

means responsive to said range to destination, said radar altitude and said altitude profile for controlling said rate of descent subsystem in response to said profile or in response to a desired fixed altitude in dependence upon an intermediate range to destination, or in dependence upon said profile for ranges less than said intermediate range;

means operable after entry to approach for controlling said descent control subsystem in response to longitudinal acceleration, radar altitude, pilot set altitude, and ground-speed;

means responsive to said radar altitude and said pilot set altitude and operable after entry into approach for engaging said radar altitude hold subsystem and holding altitude at said pilot set altitude;

means responsive to aircraft heading, wind direction, aircraft drift angle and bearing to destination for operating said heading hold subsystem and said roll attitude subsystem in manner to cause said aircraft to fly a course through a final turn into the entry to approach and to fly along a track during approach which is upwind toward said destination;

and means operable during approach to operate said deceleration control subsystem and said longitudinal portion of said lateral and longitudinal holding subsystem for causing said aircraft to decelerate from the airspeed held by said airspeed hold subsystem to substantially zero speed in response to said groundspeed along heading and said range to destination; and means responsive to airspeed for engaging the lateral portion of said lateral and longitudinal position holding subsystem in response to an airspeed less than that maintained by said airspeed hold subsystem.

* * * * *